(12) United States Patent
Hall et al.

(10) Patent No.: US 11,879,343 B2
(45) Date of Patent: *Jan. 23, 2024

(54) SYSTEMS FOR CONTROLLING VARIABLE OUTLET GUIDE VANES

(71) Applicant: Rolls-Royce Corporation, Indianapolis, IN (US)

(72) Inventors: Christopher D. Hall, Danville, IN (US); William B. Bryan, Indianapolis, IN (US); Daniel E. Molnar, Jr., Lebanon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/412,220

(22) Filed: Aug. 25, 2021

(65) Prior Publication Data

US 2023/0066572 A1 Mar. 2, 2023

(51) Int. Cl.
  *F01D 17/16* (2006.01)
  *F01D 17/02* (2006.01)
  F04D 29/56 (2006.01)
  F01D 9/04 (2006.01)

(52) U.S. Cl.
  CPC .......... *F01D 17/162* (2013.01); *F01D 17/02* (2013.01); *F01D 9/041* (2013.01); *F04D 29/563* (2013.01); *F05D 2220/32* (2013.01); *F05D 2240/12* (2013.01); *F05D 2270/05* (2013.01); *F05D 2270/101* (2013.01); *F05D 2270/304* (2013.01); *F05D 2270/334* (2013.01)

(58) Field of Classification Search
  CPC .......... F01D 17/02; F01D 17/06; F01D 17/08; F01D 17/105; F01D 17/162; F01D 25/04; F01D 25/06; F04D 29/563; F04D 29/667; F04D 29/668; F04D 27/002; F04D 27/0246; F04D 27/009; F04D 27/0207; F04D 27/0223; F02C 9/20; F02C 9/28; F02C 7/057
  See application file for complete search history.

(56) References Cited

U.S. PATENT DOCUMENTS

| 3,887,297 A | 6/1975 | Welchek |
| 3,946,554 A * | 3/1976 | Neumann ........... F04D 27/0246 415/162 |
| 4,705,452 A | 11/1987 | Karadimas |

(Continued)

*Primary Examiner* — Woody A Lee, Jr.
*Assistant Examiner* — Behnoush Haghighian
(74) *Attorney, Agent, or Firm* — Barnes & Thornburg LLP

(57) ABSTRACT

A fan assembly includes a fan duct, an inlet fan, an outlet guide vane assembly, and a control system. The inlet fan includes fan blades adapted to rotate about a central axis to force fan exit air toward an aft end of the fan duct. The outlet guide vane assembly is located in the fan duct downstream of the inlet fan and is configured to adjust a direction of the fan exit air. The outlet guide vane assembly includes a plurality of guide vanes that extend radially relative to the central axis and are configured to rotate to a first vane-pitch angle. The control system is configured to rotate the guide vanes redirect the fan exit air, vary a pressure downstream of the fan inlet, minimize intake flow distortion experienced by the inlet fan, reduce inlet fan vibratory response and/or improve fan operability margins.

20 Claims, 10 Drawing Sheets

(56) References Cited

U.S. PATENT DOCUMENTS

| | | | |
|---|---|---|---|
| 5,259,187 A * | 11/1993 | Dunbar | F02K 3/06 60/226.3 |
| 5,794,432 A * | 8/1998 | Dunbar | F02K 1/16 60/226.1 |
| 6,179,559 B1 | 1/2001 | Weaver | |
| 6,292,763 B1 * | 9/2001 | Dunbar | F04D 27/02 703/7 |
| 6,619,916 B1 | 9/2003 | Capozzi et al. | |
| 7,730,714 B2 * | 6/2010 | Wood | F02C 7/042 60/226.3 |
| 8,066,474 B1 | 11/2011 | Jansen et al. | |
| 8,333,546 B2 | 12/2012 | Colotte et al. | |
| 8,347,633 B2 * | 1/2013 | Smith | F01D 17/162 60/771 |
| 8,459,035 B2 * | 6/2013 | Smith | F01D 17/162 60/770 |
| 8,641,367 B2 | 2/2014 | Norris et al. | |
| 9,103,228 B2 | 8/2015 | Waugh et al. | |
| 9,157,366 B2 | 10/2015 | Bernard | |
| 9,540,938 B2 * | 1/2017 | Topol | F04D 29/563 |
| 9,885,291 B2 | 2/2018 | Lecordix et al. | |
| 10,233,869 B2 * | 3/2019 | Rice | F02K 3/06 |
| 10,259,565 B2 | 4/2019 | Ramakrishnan et al. | |
| 10,267,160 B2 * | 4/2019 | Rice | F02K 3/075 |
| 10,267,326 B2 * | 4/2019 | Teicholz | F02C 6/08 |
| 10,288,079 B2 | 5/2019 | Skertic | |
| 10,563,593 B2 * | 2/2020 | McNeil | F02C 9/20 |
| 10,711,626 B2 | 7/2020 | Humhauser et al. | |
| 10,737,801 B2 | 8/2020 | Sands et al. | |
| 10,794,281 B2 | 10/2020 | Nestico et al. | |
| 10,815,802 B2 | 10/2020 | Prasad | |
| 11,561,153 B2 * | 1/2023 | O'Leary | F01D 21/003 |
| 2005/0147492 A1 | 7/2005 | Mahoney et al. | |
| 2007/0119150 A1 * | 5/2007 | Wood | F02C 7/042 60/226.1 |
| 2009/0097967 A1 * | 4/2009 | Smith | F04D 29/563 415/1 |
| 2009/0297334 A1 | 12/2009 | Norris et al. | |
| 2010/0014977 A1 | 1/2010 | Shattuck | |
| 2011/0167792 A1 | 7/2011 | Johnson et al. | |
| 2012/0124964 A1 * | 5/2012 | Hasel | F04D 29/563 60/226.3 |
| 2012/0163960 A1 | 6/2012 | Ress et al. | |
| 2012/0222398 A1 * | 9/2012 | Smith | F01D 17/162 60/226.3 |
| 2013/0276425 A1 | 10/2013 | Rittenhouse | |
| 2013/0319009 A1 | 12/2013 | Parente | |
| 2015/0132106 A1 * | 5/2015 | Smith | F04D 29/563 415/108 |
| 2015/0192298 A1 * | 7/2015 | Hasel | F04D 29/563 60/774 |
| 2016/0333729 A1 * | 11/2016 | Miller | F04D 27/0292 |
| 2017/0218842 A1 | 8/2017 | Nestico et al. | |
| 2020/0088108 A1 | 3/2020 | Klein et al. | |

* cited by examiner

SYSTEMS FOR CONTROLLING VARIABLE OUTLET GUIDE VANES

STATEMENT REGARDING FEDERALLY SPONSORED RESEARCH OR DEVELOPMENT

Embodiments of the present disclosure were made with government support under Contract No. FA8650-19-F-2078 awarded by the U.S. Air Force. The government may have certain rights.

FIELD OF THE DISCLOSURE

The present disclosure relates generally to gas turbine engines, and more specifically to fan assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a fan positioned within an inlet duct of the gas turbine engine. The fan includes rotating blades that that force air into the compressor section of the engine, as well as potentially providing additional thrust via forcing air around the engine core through bypass ducts. The fan blades may experience various operability issues due to factors such as variations in the intake airflow and pressure fluctuations within the inlet and the bypass ducts.

SUMMARY

The present disclosure may comprise one or more of the following features and combinations thereof.

A fan assembly adapted for a gas turbine engine according to the present disclosure includes a fan duct, an inlet fan, an outlet guide vane assembly, and a control system. The fan duct is arranged circumferentially around a central axis. The inlet fan comprises a plurality of fan blades that extend radially outward relative to the central axis and that are adapted to rotate about the central axis to force fan exit air toward an aft end of the fan duct.

The outlet guide vane assembly is located in the fan duct axially downstream of the inlet fan and configured to adjust a direction of the fan exit air received from the plurality of fan blades, the outlet guide vane assembly including a first plurality of variable-pitch outlet guide vanes including a first variable-pitch outlet guide vane that extends radially relative to the central axis, the first variable-pitch outlet guide vane being configured to rotate to a first vane-pitch angle.

The control system is configured to rotate the first variable-pitch outlet guide vane about a first vane-pitch axis that extends radially relative to the central axis to at least one of redirect the fan exit air, vary a pressure downstream of the fan inlet, minimize intake flow distortion experienced by the inlet fan, reduce inlet fan vibratory response and/or improve fan operability margins.

In some embodiments, the control system is configured to rotate the first plurality of variable-pitch outlet guide vanes to a first arrangement of vane-pitch angles including the first vane-pitch angle in order to at least one of (i) reduce vibratory response of the plurality of fan blades in response to the fan assembly experiencing at least one given operability condition and (ii) redirect the fan exit air and minimize intake flow distortion experienced by the inlet fan in response to at least one air flow characteristic.

In some embodiments, the at least one given operability condition being experienced by the fan assembly includes at least one of forcing, stall, and flutter.

In some embodiments, the at least one air flow characteristic includes at least one of flow separation of fan inlet air, vortices in the fan inlet air, swirl of the fan inlet air, and other intake flow distortion of the fan inlet air.

In some embodiments, the control system is configured to rotate each first variable-pitch outlet guide vane of the first plurality of variable-pitch outlet guide vanes in unison such that each first variable-pitch outlet guide vane of the first plurality of variable-pitch outlet guide vanes is rotated to the first vane-pitch angle.

In some embodiments, the first plurality of variable-pitch outlet guide vanes includes at least one first group of variable-pitch outlet guide vanes and at least one second group of variable-pitch outlet guide vanes. Each variable-pitch outlet guide vane of the at least one first group of variable-pitch outlet guide vanes is different from each variable-pitch outlet guide vane of the at least one second group of variable-pitch outlet guide vanes. The at least one first group and the at least one second group of variable-pitch outlet guide vanes are each mechanically connected to each other.

In some embodiments, the control system is further configured to rotate each first variable-pitch outlet guide vane of the first plurality of variable-pitch outlet guide vanes individually relative to each other first variable-pitch outlet guide vane.

In some embodiments, the first plurality of variable-pitch outlet guide vanes includes a second variable-pitch outlet guide vane different from the first variable-pitch outlet guide vane. The control system is configured to rotate the second variable-pitch outlet guide vane to a second vane-pitch angle that is different than the first vane-pitch angle.

In some embodiments, the first plurality of variable-pitch outlet guide vanes includes a first group of first variable-pitch outlet guide vanes including the first variable-pitch outlet guide vane and at least one second group of first variable-pitch outlet guide vanes different from the first group of first variable-pitch outlet guide vanes. The control system is configured to rotate the first group of first variable-pitch outlet guide vanes to the first arrangement of first vane-pitch angles and the at least one second group of first variable-pitch outlet guide vanes to a second arrangement of second vane-pitch angles, the second vane-pitch angle being different than the first vane-pitch angle.

In some embodiments, the control system includes a processor and a non-transitory computer readable data storage medium. The control system is configured to (i) store the first arrangement as a predetermined first arrangement, (ii) store the at least one given operability condition as at least one predetermined given operability condition, and (iii) store the at least one air flow characteristic as at least one predetermined air flow characteristic in the non-transitory computer readable data storage medium. The predetermined first arrangement corresponds to at least one of the at least one predetermined given operability condition and the at least one predetermined air flow characteristic. The control system is configured to rotate the first plurality of variable-pitch outlet guide vanes to the predetermined first arrangement in response to at least one of the fan assembly experiencing the at least one predetermined given operability condition and the at least one predetermined air flow characteristic being present in the inlet air entering the inlet fan or the fan exit air.

In some embodiments, the at least one predetermined given operability condition includes a threshold inlet fan speed at which flutter begins to occur.

In some embodiments, the control system further includes a neural network configured to perform machine learning, the neural network configured to iterate over the predetermined first arrangement in order to calculate at least one second arrangement in which the first plurality of variable-pitch outlet guide vanes are configured to be rotated to in response to at least one of the fan assembly experiencing at least one operability condition and at least one air flow characteristic being present in the inlet air entering the inlet fan or the fan exit air that is not included in the at least one predetermined given operability condition and the at least one predetermined air flow characteristic.

In some embodiments, the control system is further configured to rotate the first plurality of variable-pitch outlet guide vanes to a safe zone arrangement in response to at least one of the fan assembly experiencing at least one operability condition and at least one air flow characteristic being present in the inlet air entering the inlet fan or the fan exit air that is not included in the at least one predetermined given operability condition and the at least one predetermined air flow characteristic.

In some embodiments, the control system includes at least one sensor including at least one of a dynamic sensor, a fan blade response sensor, a tip deflection sensor, a static wall pressure sensor, an altitude sensor, an angle of attack of the plurality of fan blades, and an airspeed sensor. The at least one sensor is configured to detect at least one of the at least one given operability condition and the at least one air flow characteristic.

In some embodiments, the control system includes at least one sensor located within the fan duct proximate to the plurality of fan blades. The at least one sensor is at least one of a fan blade response sensor and a tip deflection sensor configured to acquire a real-time fan blade amplitude value. The control system is further configured to rotate the first plurality of variable-pitch outlet guide vanes to the first vane-pitch angle only in response to the fan blade amplitude value being at or above a predetermined threshold value in order to reduce the fan blade amplitude value to below the predetermined threshold value.

In some embodiments, the control system is further configured to remeasure the fan blade amplitude value subsequent to the first plurality of variable-pitch outlet guide vanes being rotated to the first vane-pitch angle in response to the fan blade amplitude measurement being at or above the predetermined threshold value. The control system is further configured to rotate the first plurality of variable-pitch outlet guide vanes to a second vane-pitch angle in response to the remeasured fan blade amplitude value being at or above the predetermined threshold value in order to minimize the fan blade amplitude value.

A method according to another aspect of the present disclosure includes arranging a fan duct of a fan assembly of a gas turbine engine circumferentially around a central axis, providing an inlet fan of the fan assembly, arranging an outlet guide vane assembly in the fan duct axially downstream of the inlet fan, and rotating, via a control system, a first variable-pitch outlet guide vane of the outlet guide vane assembly.

The inlet fan comprises a plurality of fan blades that extend radially outward relative to the central axis that are adapted to rotate about the central axis to force fan exit air toward an aft end of the fan duct. The outlet guide vane assembly is configured to adjust a direction of the fan exit air received from the plurality of fan blades, the outlet guide vane assembly including a first plurality of variable-pitch outlet guide vanes including a first variable-pitch outlet guide vane that extends radially relative to the central axis, the first variable-pitch outlet guide vane being configured to rotate to a first vane-pitch angle.

In some embodiments, the rotating includes rotating the first variable-pitch outlet guide vane about a first vane-pitch axis that extends radially relative to the central axis to at least one of redirect the fan exit air, vary a pressure downstream of the fan inlet, minimize intake flow distortion experienced by the inlet fan, reduce inlet fan vibratory response and/or improve fan operability margins.

In some embodiments, the method further includes rotating, via the control system, the first plurality of variable-pitch outlet guide vanes to a first arrangement of vane-pitch angles including the first vane-pitch angle in order to at least one of (i) reduce vibratory response of the plurality of fan blades in response to the fan assembly experiencing at least one given operability condition and (ii) redirect the fan exit air and minimize intake flow distortion experienced by the inlet fan in response to at least one air flow characteristic.

In some embodiments, the at least one given operability condition being experienced by the fan assembly includes at least one of forcing, stall, and flutter. The at least one air flow characteristic includes at least one of flow separation of fan inlet air, vortices in the fan inlet air, swirl of the fan inlet air, and other intake flow distortion of the fan inlet air.

In some embodiments, the method further includes measuring a fan blade amplitude value of the plurality of fan blades via at least one sensor of the control system, and rotating, via the control system, the first plurality of variable-pitch outlet guide vanes to the first vane-pitch angle only in response to the measured fan blade amplitude value being at or above a predetermined threshold value in order to minimize the fan blade amplitude value, wherein the control system includes at least one sensor located within the fan duct proximate to the plurality of fan blades, wherein the at least one sensor is at least one of a fan blade response sensor and a tip deflection sensor configured to acquire a real-time fan blade amplitude value.

In some embodiments, the method further includes remeasuring, via the control system, the fan blade amplitude value subsequent to the first plurality of variable-pitch outlet guide vanes being rotated to the first vane-pitch angle in response to the fan blade amplitude measurement being at or above the predetermined threshold value, and rotating, via the control system, the first plurality of variable-pitch outlet guide vanes to a second vane-pitch angle in response to the remeasured fan blade amplitude value being at or above the predetermined threshold value in order to further minimize the fan blade amplitude value.

These and other features of the present disclosure will become more apparent from the following description of the illustrative embodiments.

DETAILED DESCRIPTION OF THE DRAWINGS

Figure 1:
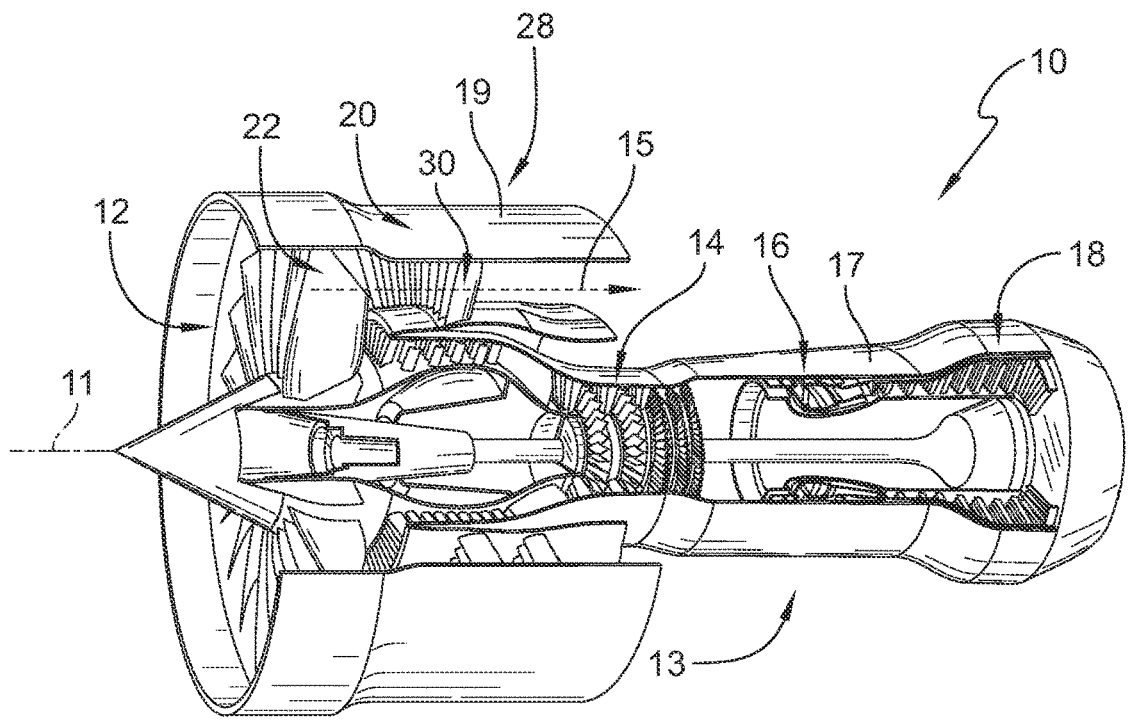
FIG. 1 is a cutaway view of a gas turbine engine that includes a fan assembly having an inlet fan having plurality of fan blades that extend radially outward relative to the central axis, an engine core having a compressor, a combustor, and a turbine, and an outlet guide vane assembly located in a fan duct axially downstream of the plurality of fan blades that is configured to adjust a direction of the fan exit air received from the plurality of fan blades.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan assembly 12 and an engine core 13 having a compressor 14, a combustor 16, and a turbine 18, as shown in FIG. 1. The fan assembly 12 is driven by the turbine 18 and provides thrust for propelling an air vehicle by forcing fan exit air 15 through a fan duct 20 that circumferentially surrounds an outer casing 17 of the engine core 13. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan may be replaced with a propeller, drive shaft, or other suitable configuration.

Figure 2:
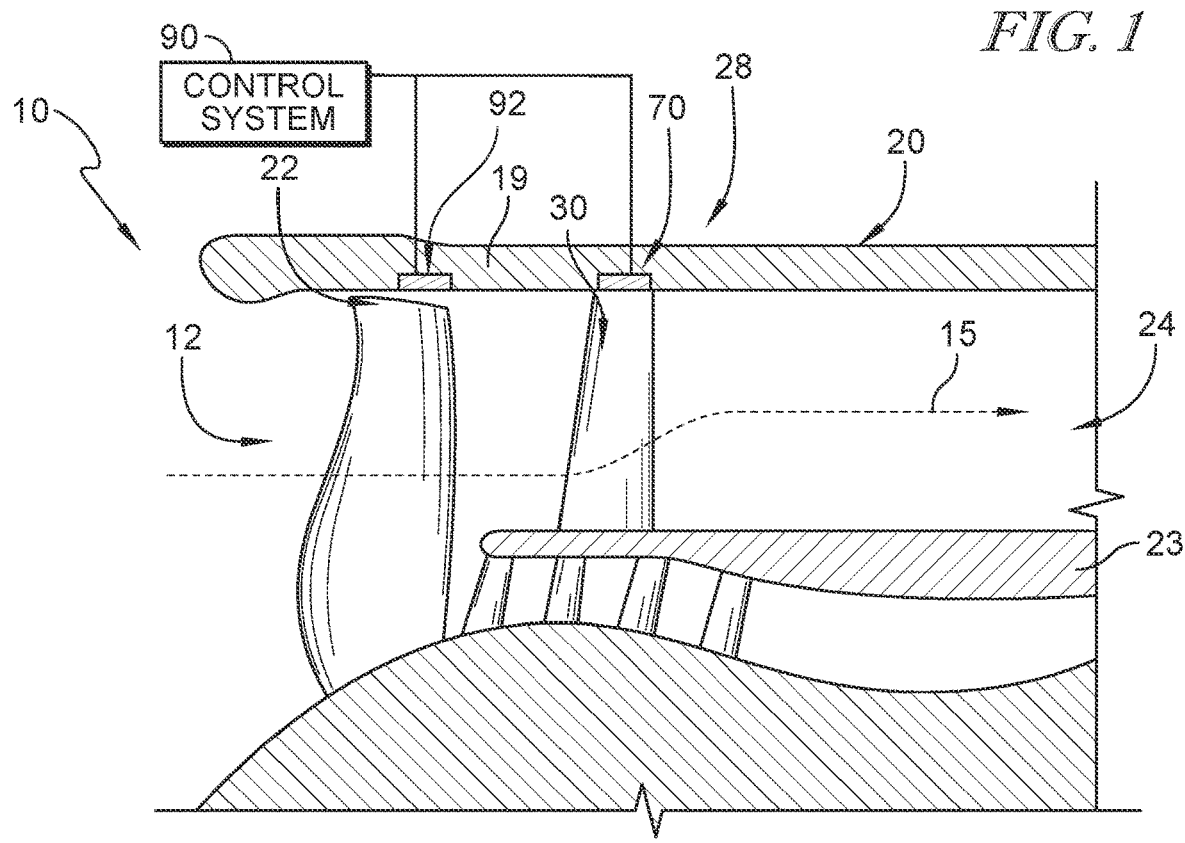
FIG. 2 is a side cross-sectional view of the gas turbine engine of FIG. 1, showing the fan assembly including the plurality of fan blades, showing that the engine further includes an outer casing and an inner wall that define a fan duct passage through which the fan exit air flows, and showing that the outlet guide vane assembly includes a first plurality of variable-pitch outlet guide vanes configured to adjust the direction of the fan exit air.
Figure 3:
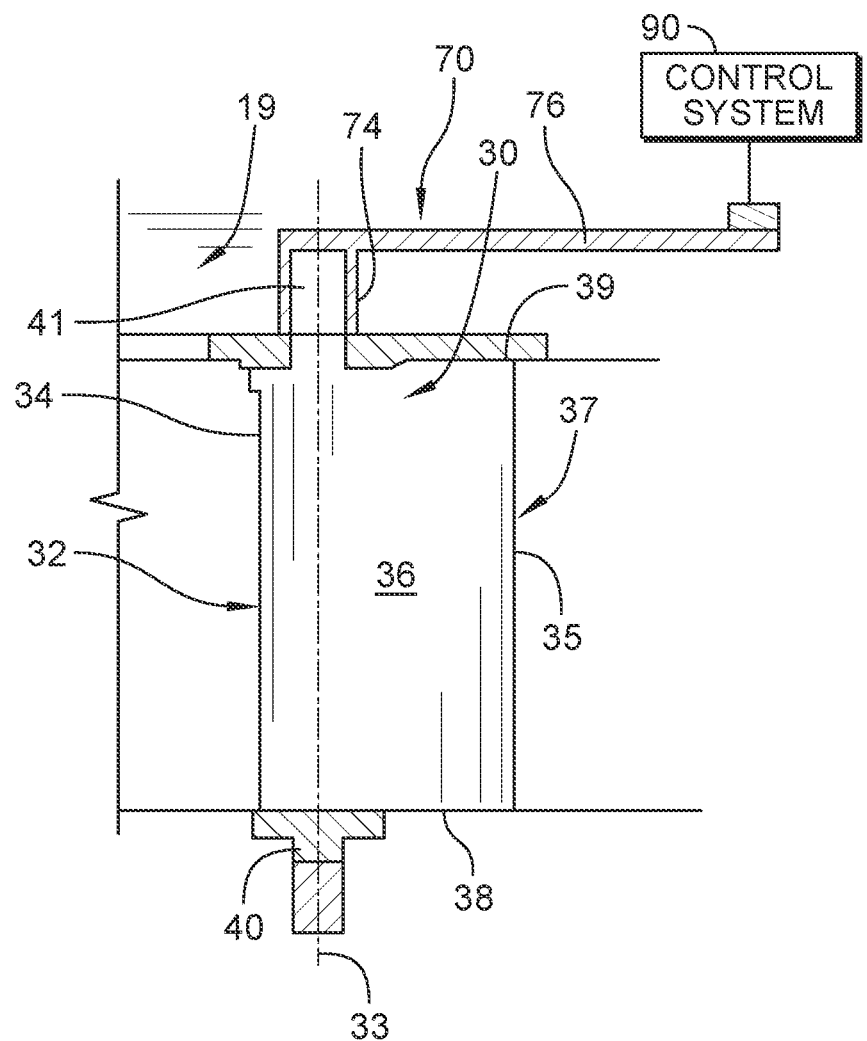
FIG. 3 is a side cross-sectional view of a guide vane of the outlet guide vane assembly of FIG. 2, showing that the guide vane is configured to rotate about a first pitch axis via an actuator of an actuation assembly.

The fan assembly 12 includes an inlet fan having a plurality of fan blades 22 that extend radially outward relative to the central axis 11 and that are located in the inlet of the gas turbine engine 10, as shown in FIGS. 1-3. The fan blades 22 direct at least a portion of the air flowing over the blades 22, this portion being fan exit air 15 as shown in FIGS. 1 and 2, through the fan duct 20 such that the fan exit air 15 bypasses the engine core 13 and provides additional thrust for the gas turbine engine 10. The fan duct 20 includes an outer fan duct casing 19 and an inner wall 23 that together define an annular fan duct passage 24 through which the fan exit air 15 flows and subsequently exits the fan duct 20 into the ambient air surrounding the engine 10.

In the illustrative embodiment, the fan assembly 12 further includes outlet guide vane assembly 28 located in the fan duct 20 axially downstream of the plurality of fan blades 22 that is configured to adjust a direction of the fan exit air 15 received from the plurality of fan blades 22, as shown in FIGS. 1-5. In the illustrative embodiment, the outlet guide vane assembly 28 includes a single first plurality of variable-pitch outlet guide vanes 30. The fan assembly 12 further includes a plurality of actuation assemblies 70 located within the outer casing 19 and each having a first actuator 74 coupled to a respective guide vane 32 to control rotation thereof.

The fan assembly 12 further includes a control system 90 configured to control rotation of the first plurality of variable-pitch outlet guide vanes 30, as shown in FIGS. 1 and 2. In particular, the control system 90 is configured to selectively control rotation of the first actuators 74 of each vane 32 so as to control the angle of incidence of the vanes 32 relative to the flow direction of the fan exit air 15 after it passes over the fan blades 22. As a result, the control system 90 is configured to control the overall flow of the fan exit air 15 after it passes over and exits the fan blades 22 in order to control fan blade 22 response to forces acting on the fan blades 22, as well as to reduce losses created by undesirable variations in the air flow.

Figure 4:
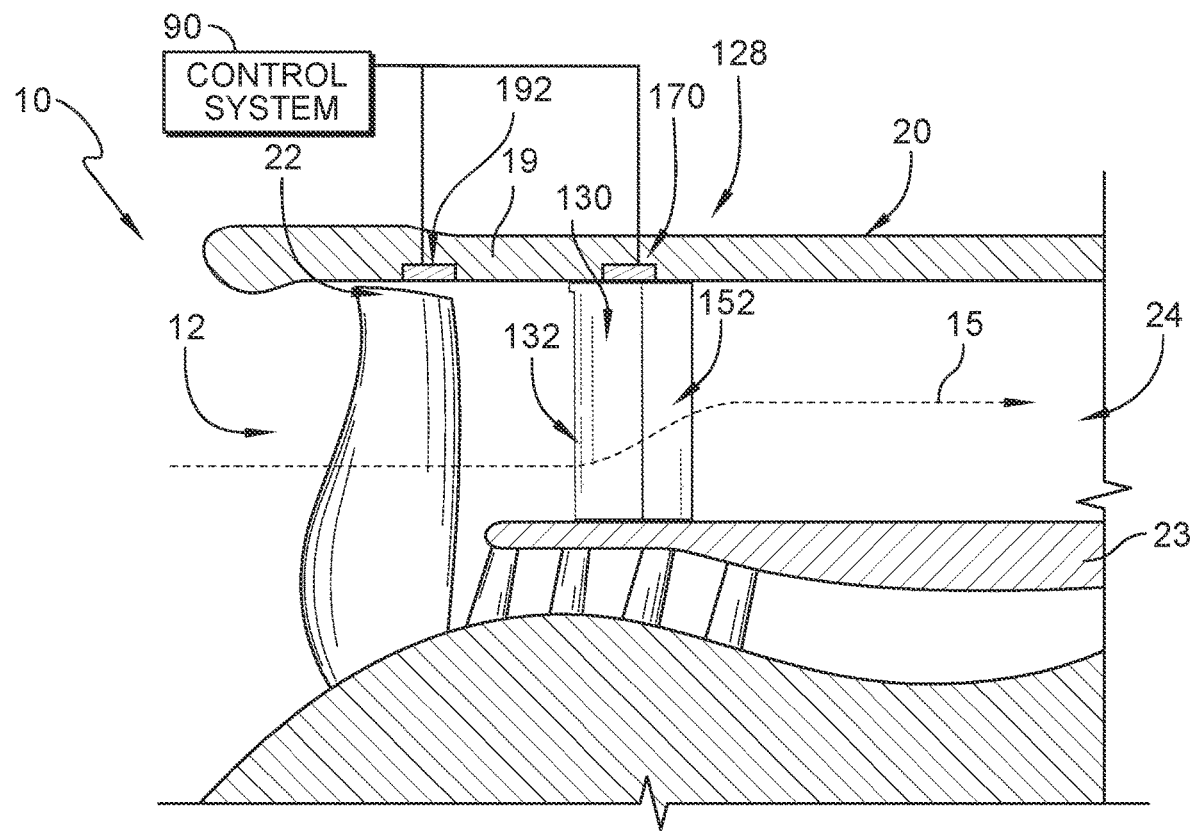
FIG. 4 is a side cross-sectional view of the gas turbine engine of FIG. 1, showing the fan assembly including the plurality of fan blades, showing that the engine further includes an outer casing and an inner wall that define a fan duct passage through which the fan exit air flows, and showing that the outlet guide vane assembly includes a first plurality of variable-pitch outlet guide vanes configured to adjust the direction of the fan exit air, each variable-pitch outlet guide vane having variable leading edge portion and a fixed trailing edge portion

The first plurality of variable-pitch outlet guide vanes 30 includes at least one first variable-pitch outlet guide vane 32 that extends radially outward relative to the central axis 11, as shown in FIG. 4. In the illustrative embodiment, the first plurality of variable-pitch outlet guide vanes 30 includes a plurality of first variable-pitch outlet guide vanes 32 disposed around a circumferential extent of an inner vane hub 31 arranged around the inner wall 23 to define a first vane stage of the fan assembly 12.

Figure 5:
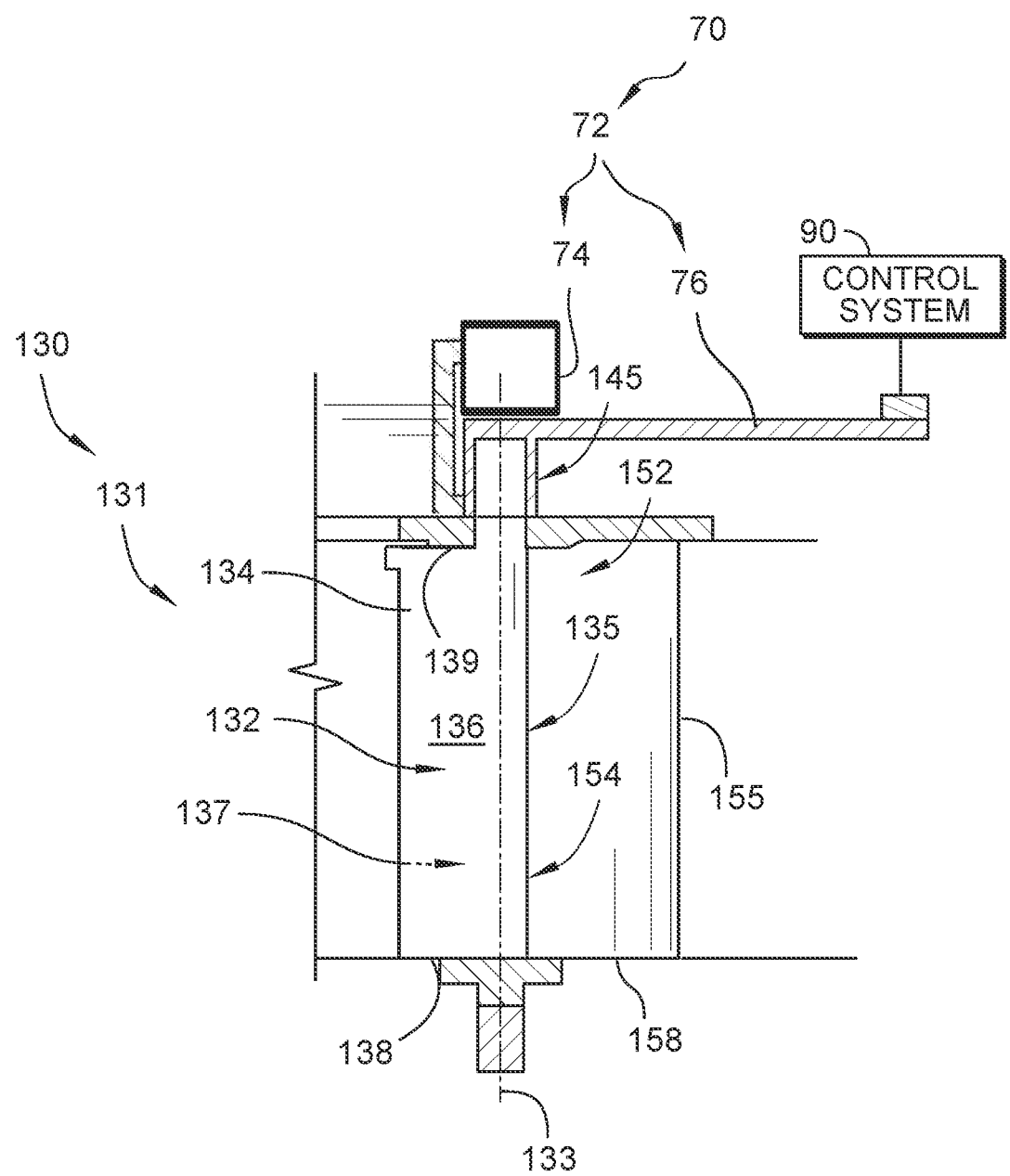
FIG. 5 is a side cross-sectional view of a guide vane of the outlet guide vane assembly of FIG. 4, showing that the guide vane includes a variable leading edge portion configured to rotate about a first pitch axis via an actuator of an actuation assembly and a fixed trailing edge portion.

Each first variable-pitch outlet guide vane 32 includes an airfoil shape having a leading edge 34 located at a forward end of the vane 32, a trailing edge 35 axially spaced apart from the leading edge 34 and located at an aft end of the vane 32, a pressure side surface 36 that extends between the leading edge 34 and the trailing edge 35 on one side of the vane 32, and a suction side surface 37 that extends between the leading edge 34 and the trailing edge 35 on an opposite side of the vane 32, as shown in FIG. 5.

Each of the variable-pitch outlet guide vanes 32 extends between a root end 38 and a tip end 39, as shown in FIG. 4. The vane 32 includes an inner pivot shaft 40 that extends from the root end 38 and into the inner vane hub 31 and is rotatably arranged therewithin to allow for rotation of the vane 32. The vane 32 further includes an outer pivot shaft 41 that extends from the tip end 39 and is coupled to the first actuator 74 of the actuation assembly 70. The first actuator 74 is configured to rotate the vane 32 about a first pivot axis 33. The root end 38 is located adjacent the inner wall 23 and the tip end 39 is located adjacent an inner surface of the outer fan duct casing 19 such that vane 32 influences the air flow of the fan exit air 15 along an entirety of a radial extent of the fan exit air 15 flow path through the fan duct 20. The inner wall 23 of the fan duct and the inner surface of the outer fan duct casing 19 define the radially inner and outer bounds of the flow path of the fan exit air 15.

Each first variable-pitch outlet guide vane 32 is configured to rotate about the first pitch axis 33, as shown in FIG. 4. In the illustrative embodiment, the first pitch axis 33 is located closer to the leading edge 34 of the vane 32 than the trailing edge 35. In some embodiments, the first pitch axis 33 is located closer to the trailing edge 35 than the leading edge 34. In some embodiments, the first pitch axis 33 is located centrally between the leading edge 34 and the trailing edge 35.

The actuation assembly 70 includes at least the first actuator 74 and a first actuator support arm 76, as shown in FIG. 4. The first actuator 74 is arranged radially outward from the vane 32 within the outer fan duct casing 19 and is coupled to a forward end of the first actuator support arm 76 so as to align the first actuator 74 with the first pivot axis 33. The first actuator 74 is coupled to the outer pivot shaft 41 so as to control rotation of the vane 32 about the first pivot axis 33. In the illustrative embodiment, the actuation assembly 70 includes a first actuator 74 and an first actuator support arm 76 for each first variable-pitch outlet guide vane 32 of the first plurality of variable-pitch outlet guide vanes 30.

The first actuator 74 may be a relatively small hydraulic actuator or an electric motor actuator such as a stepper motor. As will be discussed in detail below, sections or even individual vanes 32 of the first plurality of variable-pitch outlet guide vanes 30 may be selectively controlled by the control system 90, and as such, the size of the actuators in the actuation assembly 70 may be smaller than would be expected for a typical system configured to drive an entire vane row. In some embodiments, the vanes 32 of the first plurality of guide vanes 30 are mechanically connected to each other, as shown in FIG. 7, and thus would require larger actuators. In other embodiments, small groups of guide vanes 30 are ganged together and each group is moved via a respective actuator 74.

In some embodiments in which the vanes 32 of the first plurality of variable-pitch outlet guide vanes 30 are mechanically connected to each other, or ganged, the fan assembly 12 may further include a circumferentially extending connector arm 48 that is coupled to vane 32 such that rotation of one of the vanes 32 will rotate the remainder of the vanes 32 of the first plurality of guide vanes 30, as shown in FIG. 7. Although the circumferentially extending connector arm 48 is shown coupled to the first actuator support arm 76, the circumferentially extending connector arm 48 may be connected to any portion of the vanes 32 outside of the fan duct passage 24 so as to mechanically connect the vanes 32 with each other.

Another embodiment of an outlet guide vane 132 of a plurality of variable-pitch outlet guide vanes 130 of an outlet guide vane assembly 128 that is configured to be utilized in the fan assembly 12 is shown in FIGS. 4 and 5. The outlet guide vane assembly 128 is similar to the outlet guide vane assembly 28 shown in FIGS. 2 and 3 and described herein. Accordingly, similar reference numbers in the 100 series indicate features that are common between the outlet guide vane assembly 128 and the outlet guide vane assembly 28. The description of the outlet guide vane assembly 28 is incorporated by reference to apply to the outlet guide vane assembly 128, except in instances when it conflicts with the specific description and the drawings of the outlet guide vane assembly 128.

Similar to the outlet guide vane assembly 28, the outlet guide vane assembly 128 is located in the fan duct 20 axially downstream of the inlet fan blades 22 and is configured to adjust a direction of the fan exit air 15 received from the plurality of fan blades 22, as shown in FIG. 4. In the illustrative embodiment, the outlet guide vane assembly 128 includes a single plurality of variable-pitch outlet guide vanes 130 including a first variable-pitch outlet guide vane 131 that extends radially relative to the central axis 11, as shown in FIG. 5. The outlet guide vane assembly 128 further includes a plurality of actuation assemblies 170 including a first actuation assembly 172 connected to the first vane 131.

The first variable-pitch outlet guide vane 131 includes a variable leading edge portion 132 and a fixed trailing edge portion 152 rotatably coupled to an aft end of the leading edge portion 132, as shown in FIGS. 4 and 5. In the illustrative embodiment, the leading edge portion includes an airfoil shape having a leading edge 134 located at a forward end of the leading edge portion 132, a trailing edge 135 axially spaced apart from the leading edge 134 and located at an aft end of the leading edge portion 132, a pressure side surface 136 that extends between the leading edge 134 and the trailing edge 135 on one side of the leading edge portion 132, and a suction side surface 137 that extends between the leading edge 134 and the trailing edge 135 on an opposite side of the leading edge portion 132.

The trailing edge portion 152 similarly includes a leading edge 154 located at a forward end of the trailing edge portion 152, a trailing edge 155 axially spaced apart from the leading edge 154 and located at an aft end of the trailing edge portion 152. The trailing edge 135 of the leading edge portion 132 may be formed as a rounded surface facing the leading edge 154 of the trailing edge portion 152. Similarly, the leading edge 154 of the trailing edge portion 152 may be formed as a rounded surface facing the trailing edge 135 of the leading edge portion 132. This allows for the leading edge portion 132 to rotate relative to the trailing edge portion 152. Moreover, the cross-sectional shape of the trailing edge portion 152 continues the airfoil shape of the leading edge portion 132 such that together the leading and trailing edge portions 132, 152 form the complete airfoil shape of the vane 131.

The trailing edge portion 152 has an axial extent that is approximately equal to the axial extent of the leading edge portion 132, as shown in FIG. 3. In other embodiments, the axial extent of the trailing edge portion 152 may be greater or less than the axial extent of the leading edge portion 132 in order to accommodate the requirements of the operating conditions of the gas turbine engine. Moreover, in other embodiments, as will be described below, the trailing edge portion 152 may also be variable and rotatable relative to the leading edge portion 132.

Figure 6:
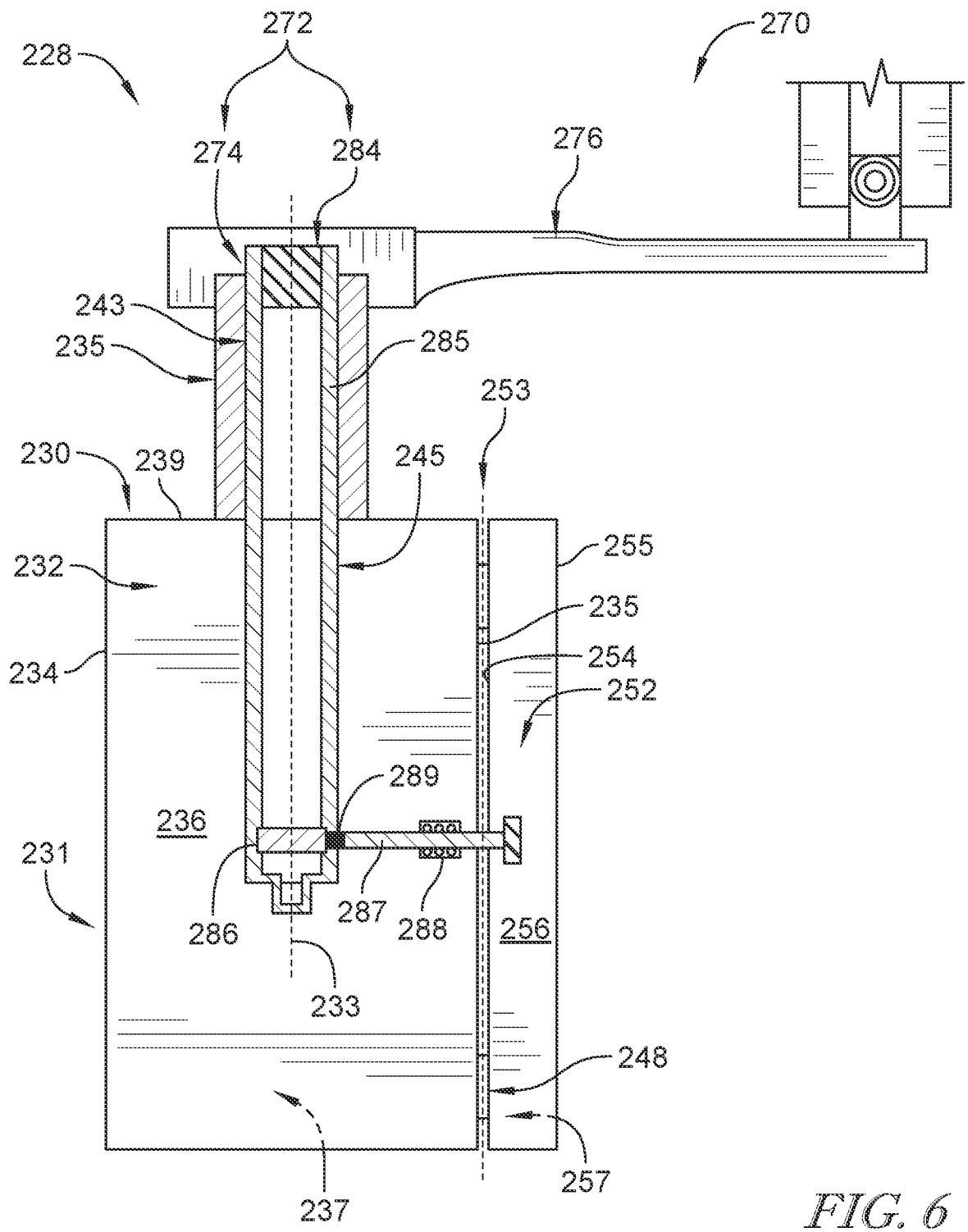
FIG. 6 is a side cross-sectional view of a guide vane of an outlet guide vane assembly according to another aspect of the present disclosure, showing that the guide vane includes a variable leading edge portion configured to rotate about a first pitch axis via an actuator of an actuation assembly and a variable trailing edge portion arranged on an axially aft end of the leading edge portion.

The first actuation assembly 172 is configured to control rotation of the first variable-pitch outlet guide vane 131, as shown in FIG. 6. In particular, the first actuation assembly 172 includes a first actuator 174 is configured to rotate the leading edge portion 132 about a leading edge pitch axis 133 that extends radially from the central axis 11. The first actuator 174 is coupled to an actuation arm 176 that connects the actuator 174 to the control system 90 and also provides structural support for the actuator 174.

Similarly to the outlet guide vane assembly 28, the control system 90 is configured to control the plurality of actuation assemblies 170, in particular the first actuation assembly 172, so as to rotate the leading edge portion 132 relative to the trailing edge portion 152 of each guide vane 131 of the plurality of guide vanes 130 to a first arrangement in which the leading edge portion 132 is rotated to specific angles. In particular, the first actuation assembly 172 is configured to rotate the leading edge portion 132 to a first leading edge angle in order to at least one of redirect the fan exit air, vary a pressure downstream of the fan inlet, minimize intake flow distortion experienced by the inlet fan, reduce inlet fan vibratory response and/or improve fan operability margins. In the illustrative embodiment, the control system 90 is configured to rotate the leading edge portion 132 to perform one of these functions while simultaneously returning the air flowing over the guide vanes 131 to an axial flow direction, or as close to axial as possible given the air flow characteristics in the fan duct 20 and the operating conditions of the engine.

In the illustrative embodiment, the first variable-pitch outlet guide vane 131 further includes a vane stem 145 extending between and connected to a radially outer end 139 of the leading edge portion 132 and to the first actuator 174, as shown in FIG. 5. The first actuator 174 is configured to rotate the vane stem 145 so as to rotate the leading edge portion 132 about the leading edge pitch axis 133.

Another embodiment of an outlet guide vane 232 of a plurality of variable-pitch outlet guide vanes 230 of an outlet guide vane assembly 228 that is configured to be utilized in the fan assembly 12 is shown in FIG. 6. The outlet guide vane assembly 228 is similar to the outlet guide vane assemblies 28, 128 shown in FIGS. 1-5 and described herein. Accordingly, similar reference numbers in the 200 series indicate features that are common between the outlet guide vane assembly 228 and the outlet guide vane assemblies 28, 128. The description of the outlet guide vane assemblies 28, 128 is incorporated by reference to apply to the outlet guide vane assembly 228, except in instances when it conflicts with the specific description and the drawings of the outlet guide vane assembly 228.

Similar to the outlet guide vane assembly 28, the outlet guide vane assembly 228 is located in the fan duct 20 axially downstream of the inlet fan blades 22 and is configured to adjust a direction of the fan exit air 15 received from the plurality of fan blades 22. In the illustrative embodiment, the outlet guide vane assembly 228 includes a single plurality of variable-pitch outlet guide vanes 230 including a first variable-pitch outlet guide vane 231 that extends radially relative to the central axis 11, as shown in FIG. 6. The outlet guide vane assembly 228 further includes a plurality of actuation assemblies 270 including a first actuation assembly 272 connected to the first vane 231.

The first variable-pitch outlet guide vane 231 includes a leading edge portion 232 and a trailing edge portion 252 rotatably coupled to an aft end of the leading edge portion 232, as shown in FIG. 6. The trailing edge portion 252 may be rotatably coupled to the leading edge portion 232 via a single hinge rod 148 or a plurality of hinge rods 148. In the illustrative embodiment, the trailing edge portion 252 may be rotatably coupled to the leading edge portion 232 via two hinge rods 148.

In the illustrative embodiment, the leading edge portion includes an airfoil shape having a leading edge 234 located at a forward end of the leading edge portion 232, a trailing edge 235 axially spaced apart from the leading edge 234 and located at an aft end of the leading edge portion 232, a pressure side surface 236 that extends between the leading edge 234 and the trailing edge 235 on one side of the leading edge portion 232, and a suction side surface 237 that extends between the leading edge 234 and the trailing edge 235 on an opposite side of the leading edge portion 232.

The trailing edge portion 252 similarly includes a leading edge 254 located at a forward end of the trailing edge portion 252, a trailing edge 255 axially spaced apart from the leading edge 254 and located at an aft end of the trailing edge portion 252, a pressure side surface 256 that extends between the leading edge 254 and the trailing edge 255 on one side of the trailing edge portion 252, and a suction side surface 257 that extends between the leading edge 254 and the trailing edge 255 on an opposite side of the trailing edge portion 252.

As can be seen in FIG. 6, the trailing edge 235 of the leading edge portion 232 may be formed as a rounded surface facing the leading edge 254 of the trailing edge portion 252. Similarly, the leading edge 254 of the trailing edge portion 252 may be formed as a rounded surface facing the trailing edge 235 of the leading edge portion 232. This allows for the leading edge portion 232 and the trailing edge portion 252 to rotate relative to each other. Moreover, as can be seen in FIG. 6, the cross-sectional shape of the trailing edge portion 252 continues the airfoil shape of the leading edge portion 232 such that together the leading and trailing edge portions 232, 252 form the complete airfoil shape of the vane 231.

In the illustrative embodiment, the trailing edge portion 252 has an axial extent that is smaller than the axial extent of the leading edge portion 232, as shown in FIG. 6. In other embodiments, the axial extent of the trailing edge portion 252 may equal to the axial extent of the leading edge portion 232 similar to the axial extents of leading and trailing edge portions 132, 152 of the variable guide vane 131 in order to accommodate the requirements of the operating conditions of the gas turbine engine.

The first actuation assembly 272 is configured to control rotation of the first variable-pitch outlet guide vane 231, as shown in FIG. 6. In particular, the first actuation assembly 272 includes a first actuator 274 is configured to rotate the leading edge portion 232 about a leading edge pitch axis 233 that extends radially from the central axis 11. The first actuation assembly 272 further includes a second actuator 284 configured to rotate the trailing edge portion 252 relative to the leading edge portion 232 about a trailing edge pitch axis 253 that is parallel to the leading edge pitch axis 233 and that passes axially through the hinge rods 148. The first actuator 274 and the second actuator 284 are coupled to an actuation arm 276 that connects the actuators 274, 284 to the control system 90 and also provides structural support for the actuators 274, 284.

Similarly to the outlet guide vane assembly 28, the control system 90 is configured to control the plurality of actuation assemblies 270, in particular the first actuation assembly 272, so as to rotate the leading edge portion 232 and the trailing edge portion 252 of each guide vane 231 of the plurality of guide vanes 230 to a first arrangement in which the leading edge portion 232 and the trailing edge portion 252 are rotated to specific angles. In particular, the first actuation assembly 272 is configured to rotate the leading edge portion 232 to a first leading edge angle in response to the gas turbine engine operating at a given operating condition so as to redirect the fan exit air 15 in a first direction and is further configured to rotate the trailing edge portion 252 to a first trailing edge angle relative to the leading edge portion 232 in order to redirect the fan exit air 15 flowing in the first direction in a second direction to further minimize losses created by distortions in the fan exit air and created by the leading edge portion redirecting the fan exit air in the first direction. In the illustrative embodiment, the control system 90 is configured to rotate the trailing edge portion 252 to redirect the fan exit air 15 in a second direction different than the first direction such that the fan exit air 15 returns to an axial flow direction, or as close to axial as possible given the air flow characteristics in the fan duct 20 and the operating conditions of the engine.

In the illustrative embodiment, the first variable-pitch outlet guide vane 231 further includes a vane stem 235 extending between and connected to a radially outer end 239 of the leading edge portion 232 and to the first actuator 274, as shown in FIG. 6. The first actuator 274 is configured to rotate the vane stem 235 so as to rotate the leading edge portion 232 about the leading edge pitch axis 233. The vane stem 235 includes a vane stem trim cavity 243 formed within the vane stem 235 and extending radially and opening at a radially outer and radially inner end of the vane stem 235.

The leading edge portion 232 includes a radially extending leading edge portion trim cavity 245 formed within the leading edge portion 232 and that opens at the radially outer end 239 of the leading edge portion 232, as shown in FIG. 6. In the illustrative embodiment, the radially extending leading edge portion trim cavity 245 and the vane stem trim cavity 243 are coaxial. The first actuation assembly 272 further includes the second actuator 284 and a control rod 285 connected to the second actuator 284 and extending radially inwardly through the vane stem trim cavity 243 and into the leading edge portion trim cavity 245 of the leading edge portion 232. The control rod 285 is coaxial with the leading edge pitch axis 233 of the leading edge portion 232. The control rod 285 is configured to rotate within the cavities 243, 245 such that the leading edge portion 232 including the vane stem 235 may rotate independently of the control rod 285.

The first actuation assembly 272 further includes a cam 286 coupled to a radially inner portion of the control rod 285 and located within the leading edge portion trim cavity 245 of the leading edge portion 232, as shown in FIG. 6. The assembly 272 further includes a spring-loaded cam rod 287 having a first end and an opposite second end. The first end of the cam rod 287 includes a follower 289 that is configured to engage the cam 286. The second end is rotatably coupled to the trailing edge portion 252. In the illustrative embodiment, the cam rod 287 is located within the leading edge portion 232 and is curved such that it generally follows the contour of the pressure side surface 236 of the leading edge portion 232 and exits the leading edge portion 232 near the trailing edge 235 and extends to and couples to the trailing edge portion 252. The cam 286 and the follower 289 are also located within the leading edge portion 232.

The second actuator 284 is configured to rotate the control rod 285 so as to rotate the cam 286, as suggested by FIG. 6. The cam 286 may include a cam shape such as a wedge shape, an eccentric shape, an oval shape, an elliptical shape, or other known cam shape. As a result of the rotation of the cam 286, the shape of the cam engages the follower 289 and moves the spring-loaded cam rod 287 along a cam guide 288 in an axial direction such that the cam rod 287 rotates the trailing edge portion 252 about the trailing edge pitch axis 253. The cam guide 288 may include a spring to load the cam rod 287 towards the cam 286.

Figure 7A:
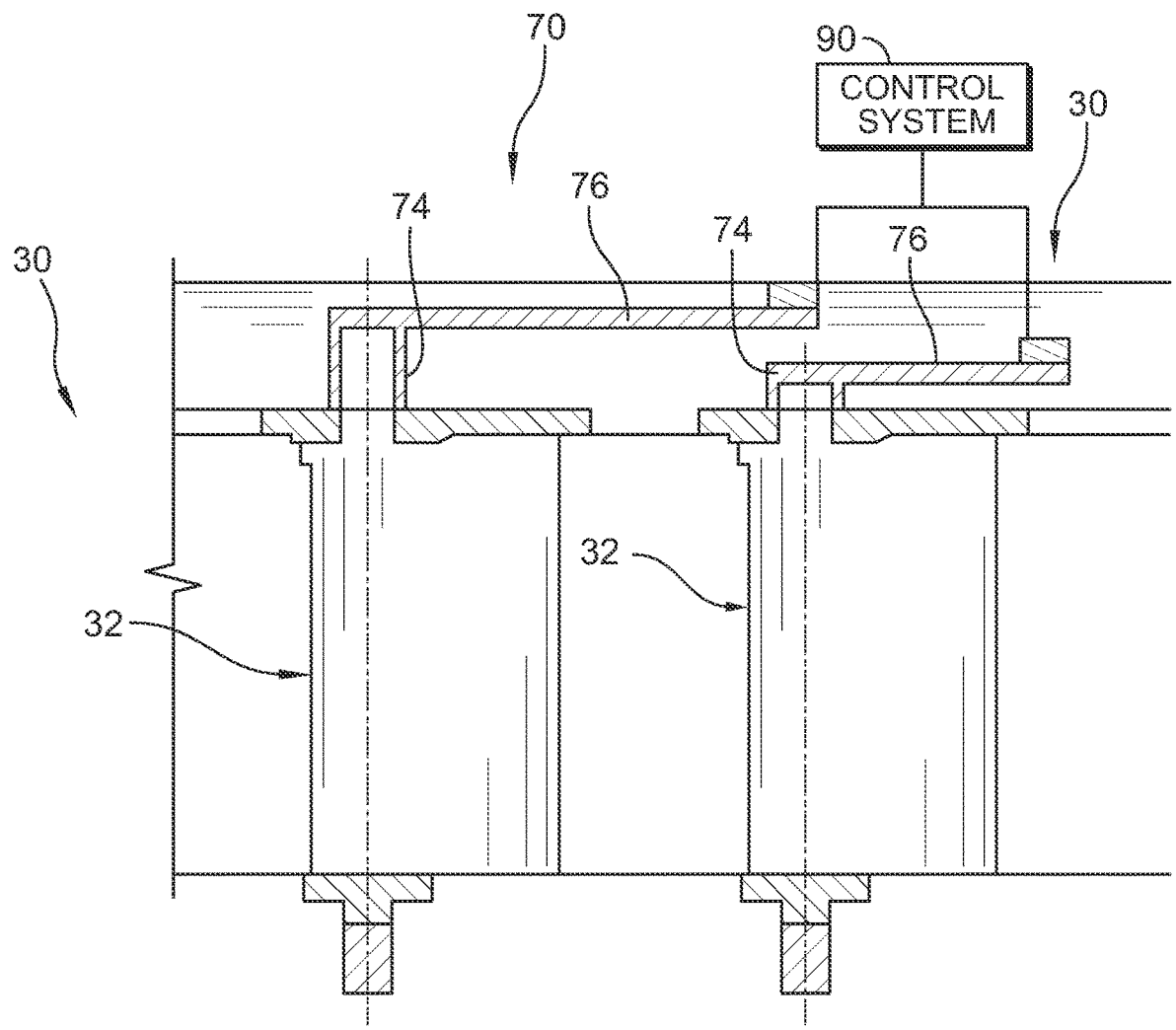
FIG. 7A is a side cross-sectional view of the fan assembly of FIG. 1, showing that the fan assembly includes a first plurality of guide vanes of the vanes shown in FIGS. 2 and 3 each configured to rotate about a first pitch axis to a first vane-pitch angle, and showing that the fan assembly further includes a second plurality of guide vanes of the vanes shown in FIGS. 2 and 3 each configured to rotate about a second pitch axis to a second vane-pitch angle.
Figure 7B:
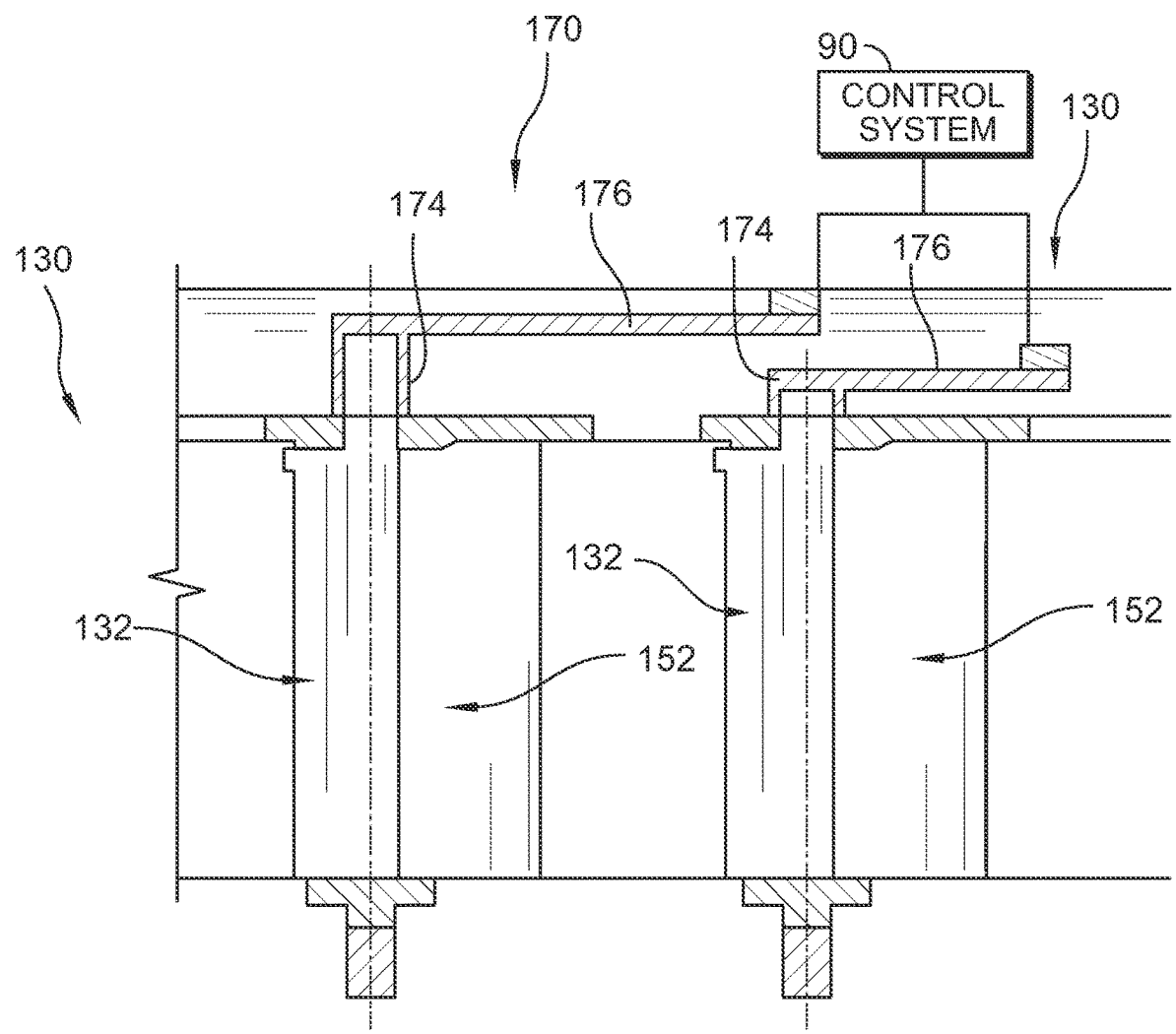
FIG. 7B is a side cross-sectional view of the fan assembly of FIG. 1, showing that the fan assembly includes a first plurality of guide vanes of the vanes shown in FIGS. 4 and 5 each having a variable leading edge portion and a fixed trailing edge portion, and showing that the fan assembly further includes a second plurality of guide vanes of the vanes shown in FIGS. 4 and 5 each having a variable leading edge portion and a fixed trailing edge portion.
Figure 7C:
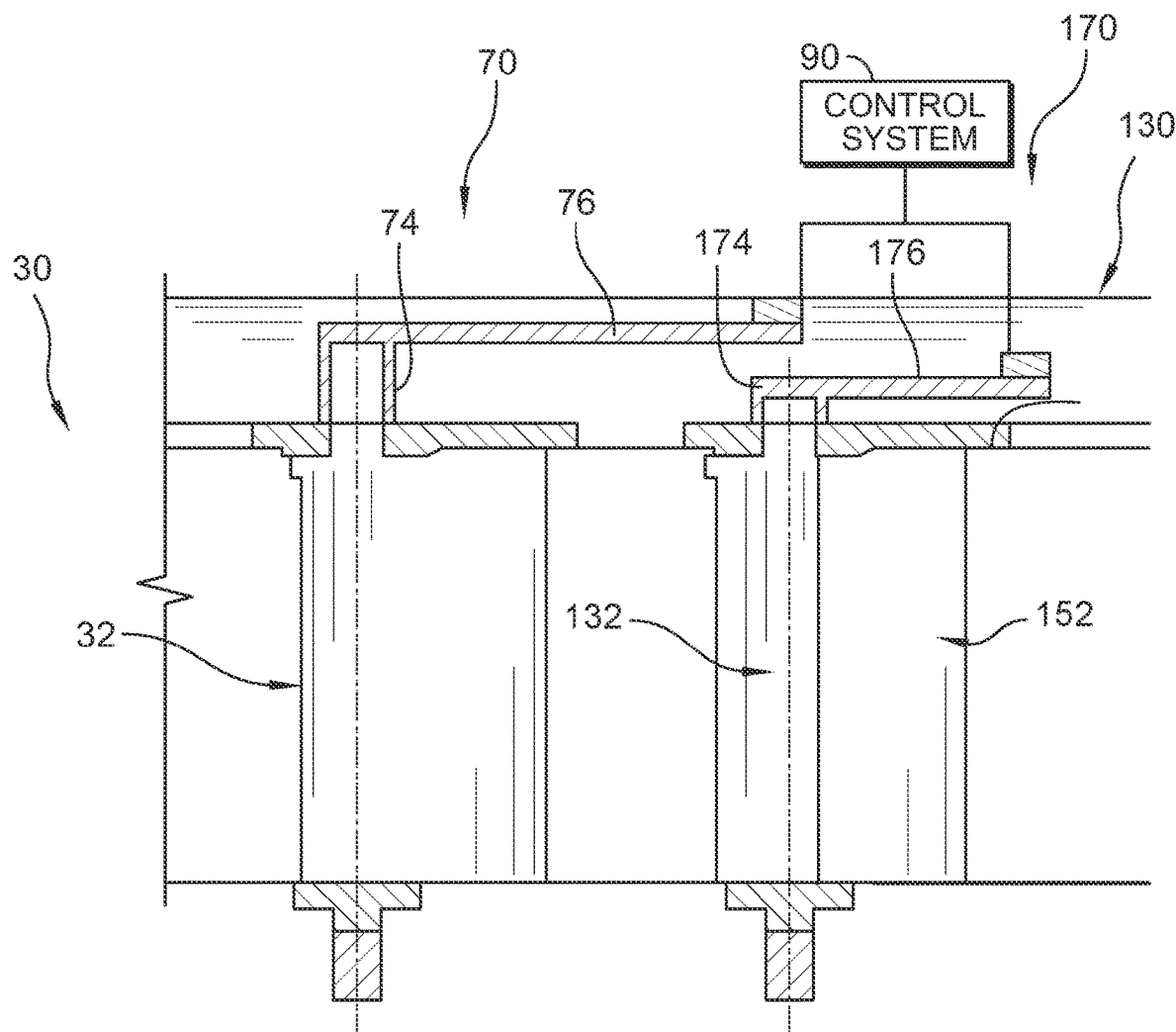
FIG. 7C is a side cross-sectional view of the fan assembly of FIG. 1, showing that the fan assembly includes a first plurality of guide vanes of the vanes shown in FIGS. 2 and 3 each configured to rotate about a first pitch axis to a first vane-pitch angle, and showing that the fan assembly further includes a second plurality of guide vanes of the vanes shown in FIGS. 4 and 5 each having a variable leading edge portion and a fixed trailing edge portion.

In some embodiments of the present disclosure, an outlet guide vane assembly includes a plurality of variable-pitch outlet guide vanes may include at least two rows of variable-pitch outlet guide vanes 30, at least two rows of variable-pitch outlet guide vanes 130, or one row of variable-pitch outlet guide vanes 30 and one row of variable-pitch outlet guide vanes 130, as shown in FIGS. 7A, 7B, and 7C. For example, in some embodiments, the outlet guide vane assembly includes a first row of variable-pitch outlet guide vanes 30 and a second row located axially aft of the first row of variable-pitch outlet guide vanes 130. In some embodiments, the outlet guide vane assembly includes a first row of variable-pitch outlet guide vanes 30 and a second row located axially aft of the first row of variable-pitch outlet guide vanes 230. In other embodiments, the first row of variable-pitch outlet guide vanes includes at least one first circumferential sector that includes the variable-pitch outlet guide vanes 30 and at least one second circumferential sector that includes the variable-pitch outlet guide vanes 130 or the variable-pitch outlet guide vanes 230. This embodiment may also include a similar second row of variable-pitch outlet guide vanes that include a similar combination of vanes. Any other combinations of the variable-pitch outlet guide vanes 30, 130, 230 may be utilized in full rows of vanes or in particular sections or sectors of each row of vanes in order to accommodate the needs of the operating conditions of the gas turbine engine.

The control system 90 is configured to control rotation of the first plurality of variable-pitch outlet guide vanes 30, 130, 230. In particular, the control system 90 is configured to selectively control rotation of the actuators 74, 174, 272, 284 of each vane 30, 130, 230 or leading edge portion and trailing edge portion of each vane 30, 130, 230 so as to control the angle of incidence of each vane 30, 130, 230 or leading edge portion and trailing edge portion of each vane 30, 130, 230 relative to the flow direction of the fan exit air 15 after it passes over the fan blades 22. Moreover, in embodiments that include multiple rows of guide vanes, the control system 90 is also configured to control the angle of incidence of the second row of vanes relative to the flow direction of the fan exit air 15 after it passes over the first row of vanes. As a result, the control system 90 is configured to control the overall flow of the fan exit air 15 after it passes over and exits the fan blades 22 in order to control fan blade 22 response to forces acting on the fan blades 22, as well as to reduce losses created by undesirable variations in the air flow.

In some embodiments, the control system 90 is configured to rotate the variable-pitch outlet guide vanes to a first arrangement of vane-pitch angles in order to reduce vibratory response of the plurality of fan blades 22 in response to the fan assembly 12 experiencing at least one given operability condition and/or redirect the fan exit air 15 and minimize intake flow distortion experienced by the fan blades 22 in response to at least one air flow characteristic being present in the air flow.

The control system 90 is further configured to rotate each vane 32 of the first plurality of variable-pitch outlet guide vanes 30 to a first vane-pitch angle in response to the gas turbine engine 10 operating at a given operating condition so as to redirect the fan exit air 15 in a first direction. In particular, the operating condition in which the fan assembly 12 and gas turbine engine 10 are operating in may include at least one of take-off, climb, cruise, descent, and landing of an aircraft having the engine 10 equipped. In each of these operating conditions, the plurality of fan blades 22 and/or the outlet vanes 30 of the fan assembly 12 may experience various undesirable operability issues such as forcing, stall, and flutter due to inlet distortions experienced by the inlet fan. For example, the engine 10 may operate in particular speed ranges for each of the operating conditions, and as a result, the fan blades 22 may experience greater or lower levels of forcing, stall, and flutter due to distortion flows in response to the engine 10 operating in particular speed ranges.

In order to compensate for these forces acting on the fan blades 22, the control system 90 is configured to rotate the first plurality of variable-pitch outlet guide vanes 30 to an arrangement of first vane-pitch angles in order to alter the angle of the flow of fan exit air 15 after it exits the fan blades 22. In order to recover the losses created by inlet flow distortion, including vortices, swirl, and/or other intake flow distortion, the control system 90 is configured to adjust the amount of rotation of the first plurality of variable-pitch outlet guide vanes 30 in order to maximize the reduction in vibratory response while simultaneously altering the angle of the flow of fan exit air 15 such that the fan exit air 15 returns to an axial, uniform flow direction, or as close to axial and uniform as possible given the air flow and operating conditions, thus minimizing the losses caused by the undesirable airflow.

In embodiments that include two rows of outlet guide vanes, the control system 90 is configured to rotate the second row of outlet guide vanes to an arrangement of second vane-pitch angles in order to alter the angle of the flow of fan exit air 15 after it exits the first row of outlet guide vanes. In the illustrative embodiment, the control system 90 is configured to rotate the second row of vanes to redirect the fan exit air 15 in a second direction different than the first direction that the first row of vanes had redirected the airflow to. As a result, the fan exit air 15 returns to an axial, uniform flow direction, or as close to axial and uniform as possible given the air flow and operating conditions. This change in the angle of flow as the fan exit air 15 passes over the second plurality of variable-pitch outlet guide vanes also further reduces the losses created by flow separation, vortices, swirl, and/or intake flow distortion.

The control system 90 is operable to control the plurality of variable-pitch outlet guide vanes 30, 130, 230, in embodiments having a single row of vanes or two or more rows of vanes, in a variety of configurations and arrangements in order to compensate for the forcing, stall, flutter, flow distortion, flow separation, vortices, swirl, and any other undesirable effects.

For example, in some embodiments, the control system 90 is configured to rotate each outlet guide vane 32, 132, 232 of the plurality of outlet guide vanes 30, 130, 230 in unison such that each outlet guide vane 32, 132, 232 is rotated to the same vane-pitch angle. In some embodiments, the first plurality of outlet guide vanes 30, 130, 230 are each mechanically connected to each other. In other embodiments, small groups of guide vanes 30, 130, 230 are ganged together and each group is moved via a respective actuator.

In other embodiments, the control system 90 is configured to rotate each outlet guide vane 32, 132, 232 of the plurality of outlet guide vanes 30, 130, 230 individually relative to each other. For example, the plurality of outlet guide vanes 30, 130, 230 includes a second outlet guide vane different from the first outlet guide vane 32, 132, 232. The control system 90 is configured to rotate the second outlet guide vane to a second vane-pitch angle that is different than the vane-pitch angle that the first outlet guide vane 32, 132, 232 is rotated to.

In some embodiments, the first plurality of outlet guide vanes 30, 130, 230 includes a first group of first outlet guide vanes including the first outlet guide vane 32, 132, 232 and at least one second group of first outlet guide vanes 32, 132, 232 different from the first group of first outlet guide vanes 32, 132, 232. The control system 90 is configured to rotate the first group of first outlet guide vanes 32, 132, 232 to the first arrangement of first vane-pitch angles and the at least one second group of first outlet guide vanes 32, 132, 232 to a second arrangement of second vane-pitch angles, the second vane-pitch angle being different than the first vane-pitch angle. For example, in some embodiments, one half of the first plurality of outlet guide vanes 30, 130, 230 is the first group and the other half of the first plurality of outlet guide vanes 30, 130, 230 is the second group.

In some embodiments, the control system 90 is configured to rotate at least two different groups of outlet guide vanes 32, 132, 232. For example, the control system 90 may be configured to selectively rotate each group of outlet guide vanes 32, 132, 232 to create non-uniform backpressure that drives the fan inlet distortion flows within the inlet fan to change or redistribute around the circumference of the inlet fan. This locally reduces loading on fan blades 22 within a lip separated flow with low local pressure to reduce forcing and/or improve the uniformity of flow in general through the fan to reduce forcing. In particular, fully opening (allowing full flow through the guide vanes) at least one group of outlet guide vanes 32, 132, 232 and fully closing at least one further group of outlet guide vanes 32, 132, 232 (allowing no flow through the guide vanes) reduces a tendency for a local stall of the fan blades 22 that could lead to early overall stall in the fan. In some embodiments, the control system 90 is configured to rotate a large group of outlet guide vanes 32, 132, 232 which counters bulk swirling flows or local changes to improve localized intake swirl gradients to improve fan performance and operability.

In some embodiments, each group of guide vanes 32, 132, 232 includes a single actuator configured to control rotation of that specific group of guide vanes. Each guide vane 32, 132, 232 also includes an actuator arm that connects the vane to its respective connector arm so as to mechanically couple each vane group together.

Figure 8:
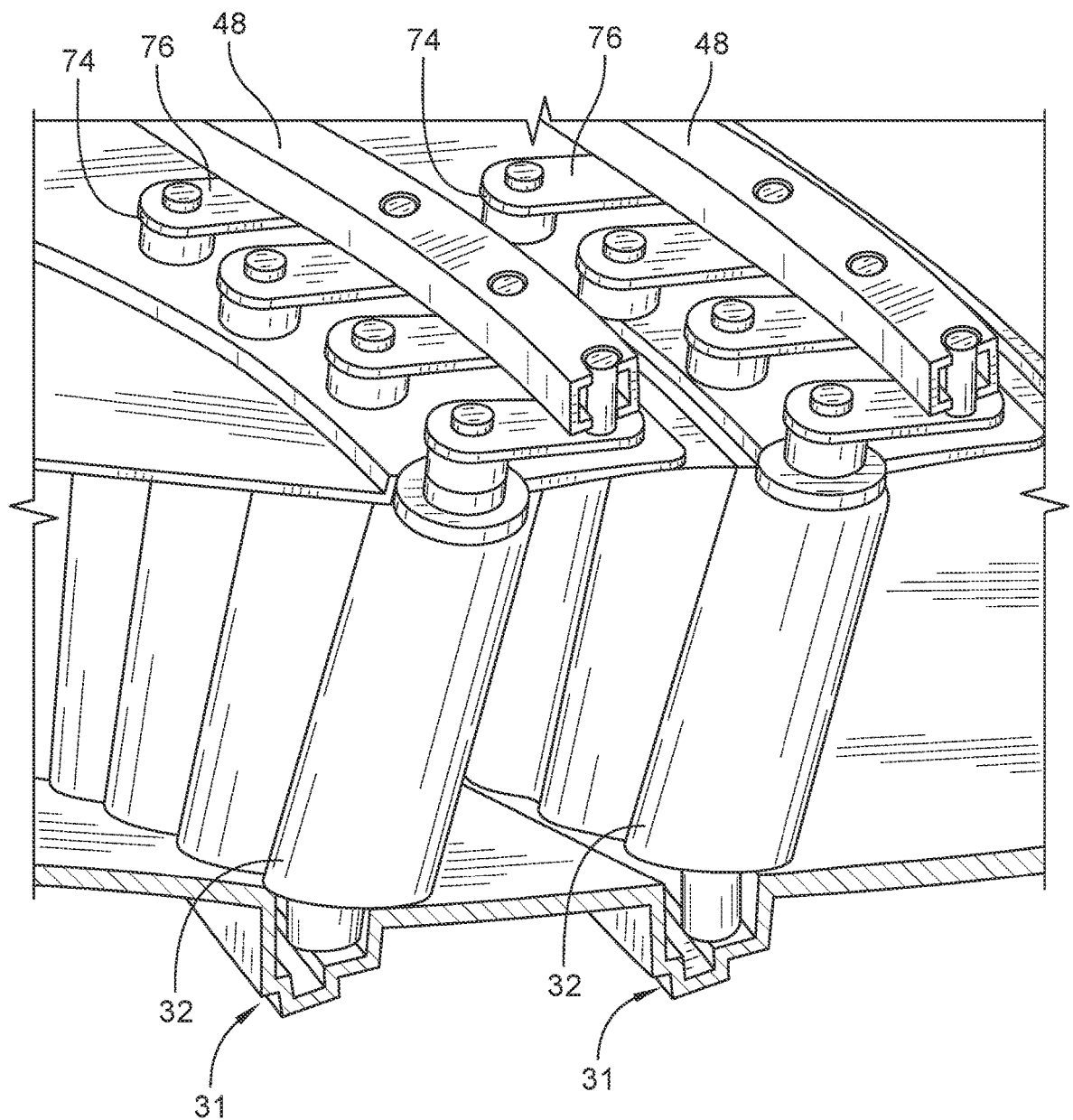
FIG. 8 is a cutaway perspective view of the outlet guide vane assembly of FIGS. 2 and 3, showing the first plurality of guide vanes and the second plurality of guide vanes mechanically coupled to each other.

In some embodiments, the outlet guide vane assembly 28, 128, 228 only includes a single row of the first plurality of outlet guide vanes 32, 132, 232. In at least some embodiments, every vane of the first plurality of outlet guide vanes is mechanically connected to each other, or ganged, via the circumferentially extending connector arm 48, as shown in FIG. 8. The connector arm 48 extends entirely around the circumference of the outlet guide vane assembly 28, 128, 228 and is coupled to each vane such that rotation of one of the vanes will rotate the remainder of the vanes of the first plurality of guide vanes. In the illustrative embodiment, the circumferentially extending connector arm 48 is shown coupled to the first actuator support arm 76 of each vane 32, 132, 232. In this embodiment, the first plurality of guide vanes 30, 130, 230 may be controlled by a single actuator 74 or multiple actuators 74 that total less than the total number of vanes 32, 132, 232 in the first plurality of vanes.

In at least some embodiments, the outlet guide vane assembly 28 only includes a single row of the first plurality of outlet guide vanes 30 that are individually controllable, as shown in FIG. 11B. Specifically, the control system 90 is further configured to rotate each vane 32 of the first plurality of guide vanes 30 individually relative to each other vane 32 such that each vane 32 can be rotated to any angle relative to each other vane 32. In the illustrative embodiment, each vane 32 includes a unique actuator 74 configured to rotate the vane 32 and operably connected to the control system 90 via an actuator arm 76.

In some embodiments, the control system 90 includes a processor and a non-transitory computer readable data storage medium. The control system 90 is configured to store predetermined arrangements of the plurality of the outlet guide vanes 30, 130, 230 that the control system 90 may rotate the outlet guide vanes 30, 130, 230 to when predetermined given operability conditions and/or predetermined air flow characteristics are experienced by the engine 10. Each predetermined arrangement of the outlet guide vanes 30, 130, 230 corresponds to a predetermined given operating condition or conditions and/or a predetermined air flow characteristic or characteristics, so that the outlet guide vanes 30, 130, 230 may be rotated to predetermined arrangements in response to common operability and airflow conditions of the engine 10. For example, a predetermined given operability condition may include a threshold airspeed or a range of airspeeds at which undesirable effects such as vibratory responses and flutter begin to occur. In response to this condition, the control system 90 is configured to rotate the outlet guide vanes 30, 130, 230 to a predetermined arrangement that corresponds to this operability condition in order to minimize these undesirable effects and reduce losses. In another example, a condition may be a speed range near a fan blade 22 natural mode crossing in which a forced response would be expected, and a predetermined arrangement could be stored that would reduce this forced response.

In some embodiments, the control system 90 could cope with unpredictable short transient events such as changes to the inlet profile and/or distortion caused by attitude of an aircraft based on an unexpected aircraft maneuver detected by at least one sensor 92, 192 of the control system 90 by having a predetermined safe zone arrangement in which the undesirable effects and losses are reduced are always kept to a minimum regardless of the operating condition of the engine 10. In some embodiments, the control system 90 is configured to rotate the outlet guide vanes 30, 130, 230 to this safe zone arrangement in response the fan assembly experiencing an operability condition and/or an air flow characteristic that is not included in the predetermined operability conditions and air flow characteristics.

In some embodiments, the control system 90 further includes a neural network configured to perform machine learning. The neural network is configured to iterate over the predetermined arrangement discussed above in order to calculate at least one second arrangement in which the first plurality of outlet guide vanes 30, 130, 230 are configured to be rotated to in response to the fan assembly experiencing at least one operability condition and/or at least one air flow characteristic being present in the inlet air entering the inlet fan or the fan exit air that is not included in the predetermined operability condition and the predetermined air flow characteristic discussed above.

In some embodiments, the control system 90 further includes a subsystem control that is integrated with other engine controls to further control reduction of losses created by undesirable variations in the air flow and improve engine performance and efficiency. For example, if rotation of outlet guide vanes 30, 130, 230 resulted in a fan flow drop, the subsystem control is configured to compensate for this by increasing the fan speed in order to maintain thrust, and/or by changing the exhaust area of the engine 10 in order to further reduce the losses and improve engine efficiency.

In the illustrative embodiment, the control system 90 includes at least one sensor 92, 192 including, for example, at least one of a dynamic sensor, a fan blade response sensor, a tip deflection sensor, a static wall pressure sensor, an altitude sensor, an angle of attack of the plurality of fan blades, and an airspeed sensor, as shown in FIGS. 2 and 4. The at least one sensor 92, 192 is configured to detect at least one given operability condition and at least one air flow characteristic. In some embodiments, the at least one sensor 92, 192 is arranged proximate to the fan blades 22 and within the outer casing 19 in order to efficiently detect the given operability condition and air flow characteristic.

In some embodiments, the at least one sensor 92, 192 is at least one of a fan blade response sensor and a tip deflection sensor configured to acquire a real-time fan blade amplitude value. In this embodiment, the control system 90 is configured to rotate the plurality of outlet guide vanes 30, 130, 230 to a vane-pitch angle only in response to the fan blade amplitude value being at or above a predetermined threshold value in order to minimize the fan blade amplitude value. The control system 90 is further configured to remeasure the fan blade amplitude value subsequent to the first plurality of outlet guide vanes 30, 130, 230 being rotated. If it is determined that the remeasured fan blade amplitude value is still at or above the predetermined threshold value, the control system 90 is further configured to rotate the first plurality of outlet guide vanes 30, 130, 230 to a second vane-pitch angle in order to further minimize the fan blade amplitude value to below the threshold value.

In the illustrative embodiment, the functionality of the control system 90 described herein may be implemented in various processing and computing devices, and may be located within the engine 10 or outside of the engine 10. Moreover, the functionality may be configured to operate on executable software provided on the processing and computing devices. Furthermore, the functionality disclosed herein may be implemented in various configurations using computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

Figure 9:
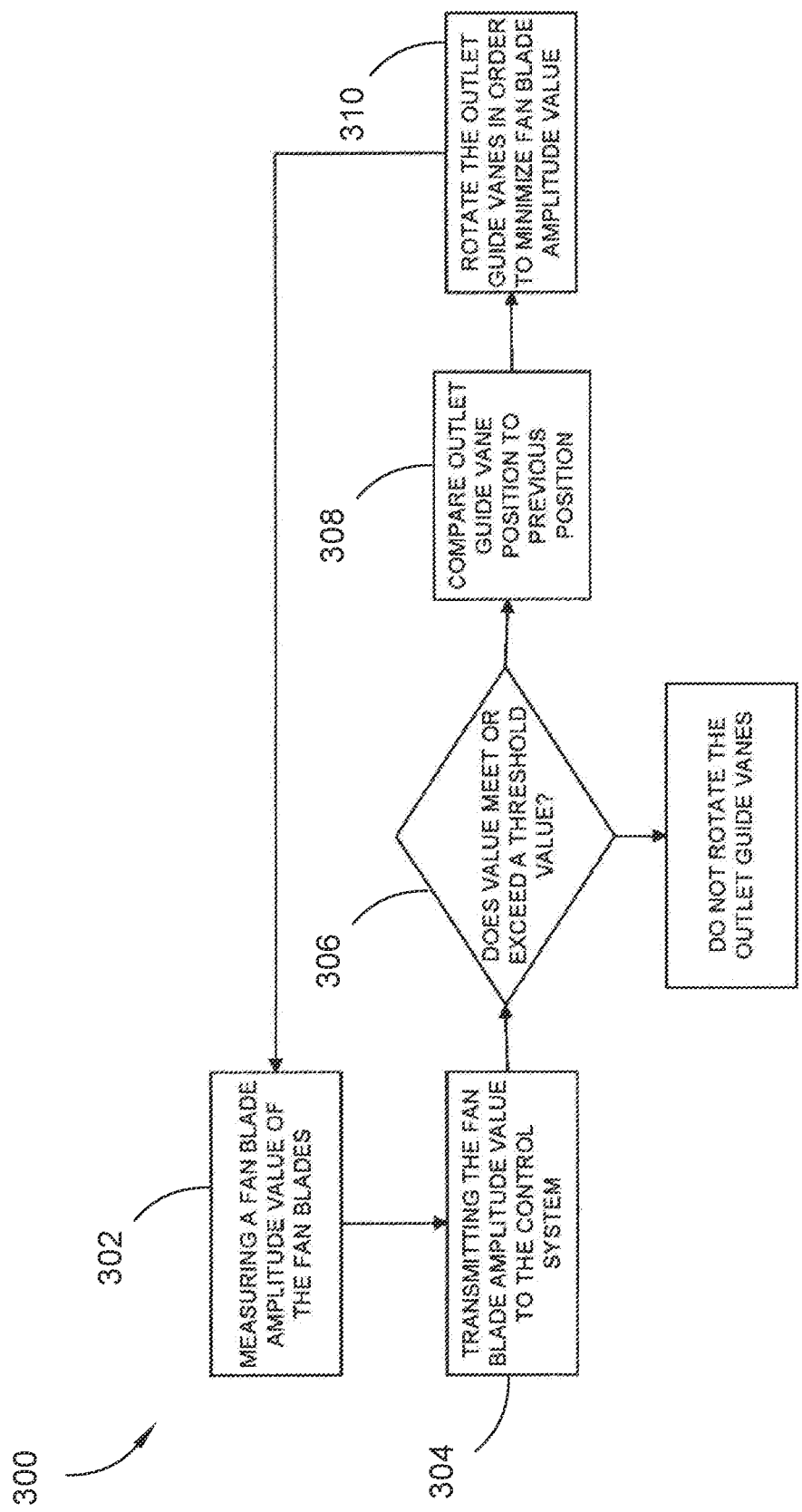
FIG. 9 is a method including measuring a fan blade amplitude value of a plurality of fan blades, transmitting the fan blade amplitude values to a control system of a gas turbine engine, determining whether the fan blade amplitude value meets or exceeds a threshold value, comparing the outlet guide vane position to previous positions if the value meets or exceed the threshold value, and rotating the outlet guide vanes in order to minimize the fan blade amplitude value.

A method 300 of performing an operation of the control system 90 is shown in FIG. 9. The method 300 includes a first operation 302 of measuring a fan blade amplitude of the plurality of fan blades 22. The method 300 includes a second operation 304 of transmitting the fan blade amplitude value to the control system 90 for processing. The method 300 further includes a third operation 306 of determining whether the fan blade amplitude value meets or exceeds a threshold value. If the fan blade amplitude value meets or exceeds a threshold value, in a fourth operation 308, the control system 90 compares the outlet guide vanes 30, 130, 230 position to a previous position that the guide vanes were rotated to in response to previous measurements of the fan blade amplitude. In a fifth operation 310, the control system 90 rotates the outlet guide vanes 30, 130, 230 in order to reduce the fan blade amplitude value. The method 300 then begins again, in which the fan blade amplitude of the plurality of fan blades 22 is remeasured. The method 300 continues until the fan blade amplitude of the plurality of fan blades 22 is below the threshold value.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan assembly adapted for a gas turbine engine, the fan assembly comprising
   a fan duct arranged circumferentially around a central axis,
   an inlet fan comprising a plurality of fan blades that extend radially outward relative to the central axis and that are adapted to rotate about the central axis to force fan exit air toward an aft end of the fan duct,
   an outlet guide vane assembly located in the fan duct axially downstream of the inlet fan and configured to adjust a direction of the fan exit air received from the plurality of fan blades, the outlet guide vane assembly including a first plurality of variable-pitch outlet guide vanes including a first variable-pitch outlet guide vane that extends radially relative to the central axis, the first variable-pitch outlet guide vane being configured to rotate to a first vane-pitch angle, and
   a control system configured to rotate the first variable-pitch outlet guide vane about a first vane-pitch axis that extends radially relative to the central axis to redirect the fan exit air,
   wherein the control system is configured to rotate the first plurality of variable-pitch outlet guide vanes to a first arrangement of vane-pitch angles including the first vane-pitch angle in order to (i) reduce vibratory response of the plurality of fan blades in response to the fan assembly experiencing at least one given operability condition and (ii) redirect the fan exit air and minimize intake flow distortion experienced by the inlet fan in response to at least one air flow characteristic,
   wherein the control system includes a processor and a non-transitory computer readable data storage medium, wherein the control system is configured to (i) store the first arrangement as a predetermined first arrangement, (ii) store the at least one given operability condition as at least one predetermined given operability condition, and (iii) store the at least one air flow characteristic as at least one predetermined air flow characteristic in the non-transitory computer readable data storage medium, wherein the predetermined first arrangement corresponds to at least one of the at least one predetermined given operability condition and the at least one predetermined air flow characteristic, and wherein the control system is configured to rotate the first plurality of variable-pitch outlet guide vanes to the predetermined first arrangement in response to at least one of the fan assembly experiencing the at least one predetermined given operability condition and the at least one predetermined air flow characteristic being present in the inlet air entering the inlet fan or the fan exit air, and
   wherein the at least one predetermined given operability condition includes a threshold inlet fan speed at which flutter begins to occur.

2. The fan assembly of claim 1, wherein the control system further includes a neural network configured to perform machine learning, the neural network configured to iterate over the predetermined first arrangement in order to calculate at least one second arrangement in which the first plurality of variable-pitch outlet guide vanes are configured to be rotated to in response to at least one of the fan assembly experiencing at least one operability condition and at least one air flow characteristic being present in the inlet air entering the inlet fan or the fan exit air that is not included in the at least one predetermined given operability condition and the at least one predetermined air flow characteristic.

3. The fan assembly of claim 1, wherein the control system is further configured to rotate the first plurality of variable-pitch outlet guide vanes to a safe zone arrangement in response to at least one of the fan assembly experiencing at least one operability condition and at least one air flow characteristic being present in the inlet air entering the inlet fan or the fan exit air that is not included in the at least one predetermined given operability condition and the at least one predetermined air flow characteristic.

4. The fan assembly of claim 1, wherein the outlet guide vane assembly further includes a second plurality of variable-pitch outlet guide vanes arranged axially downstream of the first plurality of variable-pitch outlet guide vanes, wherein second plurality of variable-pitch outlet guide vanes includes a second variable-pitch outlet guide vane that extends radially relative to the central axis, the second variable-pitch outlet guide vane being configured to rotate to a second vane-pitch angle.

5. The fan assembly of claim 4, wherein the control system is further configured to rotate the second variable-pitch outlet guide vane about a second vane-pitch axis that extends radially relative to the central axis to further redirect the fan exit air after the fan exit air passes over the first plurality of variable-pitch outlet guide vanes.

6. The fan assembly of claim 5, wherein the control system is further configured to rotate the first plurality of variable-pitch outlet guide vanes so as to redirect the fan exit air in a first direction, and wherein the control system is further configured to rotate the second plurality of variable-pitch outlet guide vanes so as to redirect the fan exit air in a second direction.

7. The fan assembly of claim 6, wherein the first direction and the second direction are parallel.

8. The fan assembly of claim 7, wherein the first direction and the second direction are not parallel.

9. The fan assembly of claim 7, wherein the first direction is not parallel with the central axis and the second direction is parallel with the central axis.

10. A fan assembly adapted for a gas turbine engine, the fan assembly comprising
    a fan duct arranged circumferentially around a central axis,
    an inlet fan comprising a plurality of fan blades,
    an outlet guide vane assembly located in the fan duct axially downstream of the inlet fan and configured to adjust a direction of the fan exit air received from the plurality of fan blades, the outlet guide vane assembly including a first plurality of variable-pitch outlet guide vanes including a first variable-pitch outlet guide vane that extends radially relative to the central axis, the first variable-pitch outlet guide vane being configured to rotate to a first vane-pitch angle, and
    a control system configured to rotate the first variable-pitch outlet guide vane about a first vane-pitch axis that extends radially relative to the central axis to redirect the fan exit air,
    wherein the control system includes a processor and a non-transitory computer readable data storage medium and is configured to rotate the first plurality of variable-pitch outlet guide vanes to a first arrangement of vane-pitch angles including the first vane-pitch angle in order to reduce vibratory response of the plurality of fan blades in response to the fan assembly experiencing at least one given operability condition,
    wherein the predetermined first arrangement corresponds to at least one of the at least one predetermined given operability condition, and wherein the control system is configured to rotate the first plurality of variable-pitch outlet guide vanes to the predetermined first arrangement in response to at least one of the fan assembly experiencing the at least one predetermined given operability condition, and
    wherein the at least one predetermined given operability condition includes a threshold inlet fan speed at which flutter begins to occur.

11. The fan assembly of claim 10, wherein the control system is further configured to rotate the first plurality of variable-pitch outlet guide vanes to a first arrangement of vane-pitch angles including the first vane-pitch angle in order to redirect the fan exit air and minimize intake flow distortion experienced by the inlet fan in response to at least one air flow characteristic.

12. The fan assembly of claim 11, wherein the control system is configured to (i) store the first arrangement as a predetermined first arrangement, (ii) store the at least one given operability condition as at least one predetermined given operability condition, and (iii) store the at least one air flow characteristic as at least one predetermined air flow characteristic in the non-transitory computer readable data storage medium.

13. The fan assembly of claim 12, wherein the predetermined first arrangement further corresponds to the at least one predetermined air flow characteristic.

14. The fan assembly of claim 13, wherein the control system is further configured to rotate the first plurality of variable-pitch outlet guide vanes to the predetermined first arrangement in response to the fan assembly experiencing the at least one predetermined air flow characteristic being present in the inlet air entering the inlet fan or the fan exit air.

15. The fan assembly of claim 14, wherein the outlet guide vane assembly further includes a second plurality of variable-pitch outlet guide vanes arranged axially downstream of the first plurality of variable-pitch outlet guide vanes, wherein second plurality of variable-pitch outlet guide vanes includes a second variable-pitch outlet guide vane that extends radially relative to the central axis, the second variable-pitch outlet guide vane being configured to rotate to a second vane-pitch angle.

16. The fan assembly of claim 15, wherein the control system is further configured to rotate the second variable-pitch outlet guide vane about a second vane-pitch axis that extends radially relative to the central axis to further redirect the fan exit air after the fan exit air passes over the first plurality of variable-pitch outlet guide vanes.

17. The fan assembly of claim 16, wherein the control system is further configured to rotate the first plurality of variable-pitch outlet guide vanes so as to redirect the fan exit air in a first direction, and wherein the control system is further configured to rotate the second plurality of variable-pitch outlet guide vanes so as to redirect the fan exit air in a second direction.

18. The fan assembly of claim 17, wherein the first direction and the second direction are parallel.

19. The fan assembly of claim 18, wherein the first direction and the second direction are not parallel.

20. The fan assembly of claim 18, wherein the first direction is not parallel with the central axis and the second direction is parallel with the central axis.

* * * * *